(12) United States Patent
Fox et al.

(10) Patent No.: US 11,601,430 B2
(45) Date of Patent: Mar. 7, 2023

(54) METHOD AND SYSTEM FOR VERIFYING USER IDENTITY

(71) Applicant: Capital One Services, LLC, McLean, VA (US)

(72) Inventors: Ryan Fox, Lebanon, OH (US); Matthew Thompson, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 5 days.

(21) Appl. No.: 17/446,184

(22) Filed: Aug. 27, 2021

(65) Prior Publication Data

US 2021/0392137 A1     Dec. 16, 2021

Related U.S. Application Data

(60) Continuation of application No. 16/449,704, filed on Jun. 24, 2019, now Pat. No. 11,108,774, which is a division of application No. 15/978,389, filed on May 14, 2018, now Pat. No. 10,333,934.

(51) Int. Cl.
| | |
|---|---|
| *G06F 21/00* | (2013.01) |
| *H04L 9/40* | (2022.01) |
| *H04L 67/02* | (2022.01) |
| *H04L 69/22* | (2022.01) |
| *H04L 67/306* | (2022.01) |

(52) U.S. Cl.
CPC ...... *H04L 63/0884* (2013.01); *H04L 63/0876* (2013.01); *H04L 63/12* (2013.01); *H04L 67/02* (2013.01); *H04L 67/306* (2013.01); *H04L 69/22* (2013.01)

(58) Field of Classification Search
CPC ............... H04L 63/0884; H04L 67/306; H04L 63/0876; H04L 67/02; H04L 69/22; H04L 63/12
See application file for complete search history.

(56) References Cited

U.S. PATENT DOCUMENTS

| | | | | |
|---|---|---|---|---|
| 5,898,780 | A * | 4/1999 | Liu | G06Q 30/0633 |
| | | | | 705/18 |
| 10,511,592 | B1 * | 12/2019 | Phruksawan | H04L 63/166 |
| 10,558,581 | B1 * | 2/2020 | Lazier | G06F 21/6218 |
| 2003/0033375 | A1 * | 2/2003 | Mitreuter | H04L 63/164 |
| | | | | 709/227 |

(Continued)

*Primary Examiner* — Kendall Dolly
(74) *Attorney, Agent, or Firm* — DLA Piper LLP (US)

(57) ABSTRACT

Embodiments disclosed herein generally relate to a system and method of verifying an identity of user. A computing system receives a HTTP request. The HTTP request includes at least a user name and an IP address associated with a router accessed by the remote client device. The computing system parses the HTTP request to extract the user name and the IP address contained therein. The computing system identifies a user account associated with the extracted user name. The computing system identifies an internet service provider associated with the IP address. The computing system transmits a verification message to the third party service provider. The computing system receives a confirmation message from the third party service provider. The computing system increases a level of confidence in an identification verification process based on the confirmation.

20 Claims, 7 Drawing Sheets

(56) References Cited

U.S. PATENT DOCUMENTS

| | | | |
|---|---|---|---|
| 2003/0154136 A1* | 8/2003 | Bittmann | G06Q 20/12 |
| | | | 705/26.1 |
| 2005/0044242 A1* | 2/2005 | Stevens | H04L 67/2876 |
| | | | 709/228 |
| 2008/0114858 A1* | 5/2008 | Singh | H04L 67/1001 |
| | | | 709/217 |
| 2008/0137593 A1* | 6/2008 | Laudermilch | H04W 48/02 |
| | | | 370/328 |
| 2011/0022704 A1* | 1/2011 | Duan | G06F 16/957 |
| | | | 709/224 |
| 2011/0060845 A1* | 3/2011 | Jungck | H04L 61/103 |
| | | | 709/245 |
| 2012/0066065 A1* | 3/2012 | Switzer | G06Q 30/0255 |
| | | | 705/1.1 |
| 2013/0144785 A1* | 6/2013 | Karpenko | G06Q 20/425 |
| | | | 705/44 |
| 2014/0222780 A1* | 8/2014 | Wu | G06F 16/2428 |
| | | | 707/722 |
| 2014/0325220 A1* | 10/2014 | Tunnell | H04L 9/3215 |
| | | | 713/168 |
| 2015/0047051 A1* | 2/2015 | Johns | H04L 63/10 |
| | | | 726/27 |
| 2015/0264073 A1* | 9/2015 | Tavakoli | H04L 63/1425 |
| | | | 726/23 |
| 2016/0156635 A1* | 6/2016 | Liu | H04W 4/50 |
| | | | 726/4 |
| 2017/0220971 A1* | 8/2017 | Giammaria | H04W 4/21 |
| 2017/0330182 A1* | 11/2017 | Kohli | H04W 12/08 |
| 2017/0345003 A1* | 11/2017 | Spears | H04L 63/102 |
| 2022/0284072 A1* | 9/2022 | Kessee | G06F 21/31 |

* cited by examiner

METHOD AND SYSTEM FOR VERIFYING USER IDENTITY

CROSS-REFERENCE TO RELATED APPLICATIONS

This is a continuation of U.S. application Ser. No. 16/449,704, filed Jun. 24, 2019, which is a divisional of U.S. application Ser. No. 15/978,389, filed May 14, 2018, now U.S. Pat. No. 10,333,934, issued Jun. 25, 2019, which are incorporated by reference in its their entirety.

FIELD OF THE DISCLOSURE

The present disclosure generally relates to a method and a system for verifying user identities based on communications received via a hypertext transfer protocol (HTTP) request.

BACKGROUND

With the rise of computer crimes, various institutions have turned to fraud detection methodologies to help identify false or misrepresented information prior to providing a customer with a product, allowing users to access their respective user accounts, allowing users to facilitate transactions across accounts, and the like. These conventional methodologies usually screen individual account applications for inconsistencies in the information provided by an individual. Other conventional methodologies may involve a two-step authentication process, by which users can further verify his/her identity prior to receiving access to his/her account.

SUMMARY

Embodiments disclosed herein generally relate to a system and method of verifying an identity of user. In one embodiment, a method of verifying an identity of a user. A computing system receives, from a remote client device, a hypertext transfer protocol (HTTP) request. The HTTP request includes at least a user name and an internet protocol (IP) address associated with a router accessed by the remote client device. The computing system parses the HTTP request to extract the user name and the IP address contained therein. The computing system identifies a user account associated with the extracted user name. The computing system identifies an internet service provider associated with the IP address. The computing system transmits a verification message to a third party service provider. The verification message includes at least personal identification information associated with the user account and the IP address. The computing system receives a confirmation message from the third party service provider indicative of a confirmation that the personal identification information associated with the user account at least partially matches personal identification information associated with an account with the internet service provider. The computing system increases a level of confidence in an identification verification process based on the confirmation.

In some embodiments, transmitting the verification message to the third party service provider includes the computing system querying a database to retrieve personal identification information associated with the user account. The computing system generates a message that includes one or more items of personal identification information.

In some embodiments, the personal identification information includes at least a name, address, social security number, telephone number, email address, date of birth, and credit card information.

In some embodiments, the personal identification information associated with the account with the internet service provider includes a name of an authorized user to a primary user of the account with the third party service provider.

In some embodiments, transmitting the verification message to the third party service provider includes the computing system transmitting a current location of the remote client device.

In some embodiments, the computing system pre-populates one or more fields of a form based on information in the confirmation message. The computing system prompts the remote client device to display the form.

In some embodiments, the third party service provider is one of the internet service provider and a credit bureau.

In another embodiment, a method of verifying an identity of a user is disclosed herein. A computing system receives, from a remote client device, a hypertext transfer protocol (HTTP) request. The HTTP request includes at least a user name and a first internet protocol (IP) address associated with a router accessed by the remote client device. The computing system identifies a previous HTTP request from the remote client device. The previous HTTP request includes the user name and a second IP address associated with a second router accessed by the remote client device. The computing system determines that the first IP address is different from the second IP address. The computing system parses the authentication attempt to extract the user name and the first IP address contained therein. The computing system identifies a user account associated with the extracted user name. The computing system identifies an internet service provider associated with the first IP address. The computing system transmits a verification message to the internet service provider associated with the first IP address. The verification message includes personal identification information associated with the user account. The computing system receives a confirmation message from the internet service provider indicative of a confirmation that the personal identification information associated with the user account at least partially matches personal identification information associated with an account with the internet service provider. The computing system increases a level of confidence in an identification verification process based on the confirmation.

In some embodiments, the computer system receives, from the remote client device, a third HTTP request, the third HTTP request includes at least the user name and a third IP address associated with a third router accessed by the remote client device. The computing system determines that the third IP address is equal to the first IP address. The computing system increases a level of confidence in an identification verification process based on the confirmation.

In some embodiments, there are no intermediary authentication attempts between the authentication attempt and the third authentication attempt.

In some embodiments, transmitting the verification message to the internet service provider associated with the first IP address includes the computing system querying a database to retrieve personal identification information associated with the user account. The computing system generates a message that includes one or more items of personal identification.

In some embodiments, the personal identification information comprises at least a name, address, social security number, telephone number, email address, date of birth, and credit card information.

In some embodiments, the personal identification information associated with an account includes a name of an authorized user to a primary user of the account with the internet service provider.

In some embodiments, transmitting the verification message to the internet service provider associated with the first IP address, includes the computing system transmitting a current location of the remote client device.

In some embodiments, the computing system pre-populates one or more fields of a form based on information in the confirmation message. In some embodiments, the computing system prompts the remote client device to display the form.

In some embodiments, transmitting the verification message to the internet service provider associated with the first IP address includes the computing system transmitting an API call comprising the verification to the internet service provider.

In another embodiment, a system is disclosed herein. The system includes a processor and a memory. The memory has programming instructions stored thereon, which, when executed by the processor, performs an operation. The operation includes receiving, from a remote client device, a hypertext transfer protocol (HTTP) request. The HTTP request includes an internet protocol (IP) address associated with a router accessed by the remote client device. The operation further includes parsing the HTTP request to extract the user name and the IP address contained therein. The operation further includes identifying a user account associated with the extracted user name. The operation further includes identifying an internet service provider associated with the IP address. The operation further includes transmitting a verification message to a third party service provider. The verification message includes at least personal identification information associated with the user account and the IP address. The operation further includes receiving a confirmation message from the third party service provider indicative of a confirmation that the personal identification information associated with the user account at least partially matches personal identification information associated with an account with the internet service provider. The operation further includes increasing a level of confidence in an identification verification process based on the confirmation.

In some embodiments, the operation of transmitting the verification message to the third party service provider includes the operations of querying a database to retrieve personal identification information associated with the user account and generating a message that includes one or more items of personal identification.

In some embodiments, the personal identification information includes at least a name, address, social security number, telephone number, email address, date of birth, and credit card information.

In some embodiments, the personal identification information associated with the account with the internet service provider includes a name of an authorized user to a primary user of the account.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a method and a system for verifying an identity of an individual and/or determining factors that may be relevant for verifying an identity of an individual. In some embodiments, one or more techniques disclosed herein may be used to help verify an identity of an individual submitting a hypertext transfer protocol (HTTP) request. For example, a user may be attempting to access his or her account, and the one or more techniques described herein may aid in further authentication of the user. In some embodiments, one or more techniques disclosed herein may verify an identity of an individual as part of a fraud algorithm. For example, upon verifying the identity of a user or determining a relevant characteristic for identity, a fraud metric in the fraud algorithm may be updated.

An example verification process provides a passive approach to verifying an identity of the user without user interaction. For example, by leveraging information associated in the HTTP request (e.g., IP address, user identification information, etc.), a back-end system may verify the user's identity (or determine a relevant characteristics that may aid in verifying a user's identity) without any involvement from the user. The disclosed processes may provide several benefits. One such benefit addresses a downfall to two-factor authentication. Users typically use the same password and user names across multiple accounts. This scenario creates a security risk when a user account is compromised by a bad actor. For example, a bad actor may be authenticated as the legitimate user, even though the user has enabled two-factor authentication, by providing a pass code (or further verification) that may have been intercepted from the user's email address. The example embodiments may eliminate this possibility based on unique data that may help identify legitimate users without requiring any further interaction by the user (or purported user).

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

To verify an identity as used herein generally includes a determination that a purported identity is likely to be valid and/or that a request is likely to be associated with the purported identity and includes, for example, granting access to a user based on a determination that the user's request for access is valid; granting a user's request based on a determination that the user's identity is correct; and authenticating a user based on a determination that the user's credentials (e.g., user name, password, IP address) are valid.

The phrase "user credentials" may refer to any set of information that may be used to identify a user. In some embodiments, user credentials may include a user name or email address. In some embodiments, user credentials may include one or more of a social security number, date of birth, name, billing zip code, and the like. In some embodiments, user credentials may include a user name/email address and password. In some embodiments, user credentials may include a personal identification number (PIN).

Figure 1:
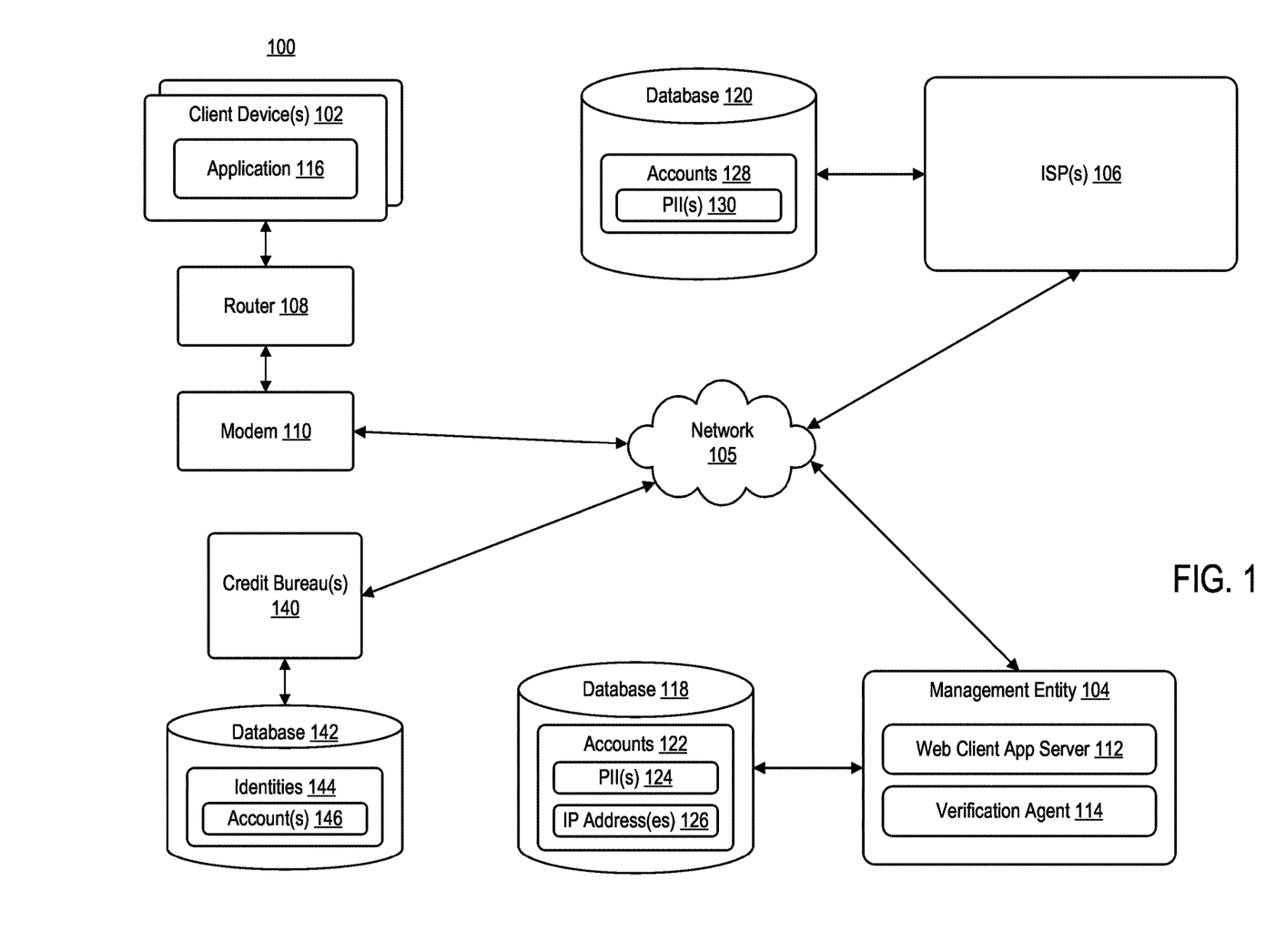
FIG. 1 is a block diagram illustrating a computing environment, according to one embodiment.

FIG. 1 is a block diagram illustrating a computing environment 100, according to one embodiment. Computing environment 100 may include at least a client device 102 and management entity 104 communicating via network 105. Client device 102 may be operated by a user (or customer). For example, client device 102 may be a mobile device, a tablet, a desktop computer, or any computing system having the capabilities described herein. Client device 102 may belong to or be provided by a customer, or may be borrowed, rented, or shared. Customers may include individuals such as, for example, subscribers, clients, prospective clients, or customers of an entity associated with management entity 104, such as individuals who have obtained, will obtain, or may obtain a product, service, or consultation from an entity associated with management entity 104.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Client device 102 may include at least application 116. Application 116 may be representative of a web browser that allows access to a website or a stand-alone application. Client device 102 may access application 116 to access functionality of management entity 104. Client device 102 may communicate over network 105 to request a webpage, for example, from web client application server 112. For example, client device 102 may be configured to execute application 116 to access content managed by web client application server 112. The content that is displayed to client device 102 may be transmitted from web client application server 112 to client device 102, and subsequently processed by application 116 for display through a graphical user interface (GUI) of client device 102.

Computing environment 100 may further include a router 108, a modem 110, and an Internet service provider (ISP) 106. Router 108 may be configured to sit between client device 102 and modem 110. For example, router 108 may be configured to receive one or more internet protocol (IP) packets from client device 102 and forward the one or more IP packets to modem 110. Modem 110 may be configured to establish and maintain connection with the Internet. For example, modem 110 may be configured to establish and maintain connection with an Internet service provided by ISP 106. In some embodiments, router 108 and/or modem 110 may be associated with ISP 106.

Management entity 104 may include verification agent 114. Verification agent 114 may be comprised of one or more software modules. The one or more software modules are collections of code or instructions stored on a media (e.g., memory of management entity 104) that represent a series of machine instructions (e.g., program code) that implements one or more algorithmic steps. Such machine instructions may be the actual computer code the processor of management entity 104 interprets to implement the instructions or, alternatively, may be a higher level coding of the instructions that is interpreted to obtain the actual computer code. The one or more software modules may also include one or more hardware components. One or more aspects of an example algorithm may be performed by the hardware components (e.g., circuitry) itself, rather as a result of an instruction.

Verification agent 114 may be configured to interact with client device 102 via application 116 to verify (or increase likelihood of verifying) an identity of a user operating client device 102. In some embodiments, verification agent 114 may verify an identity of user during an authentication process. For example, a user may be attempting to access his or her account, and verification agent 114 may be configured to aid in further authentication of the user. In some embodiments, verification agent 114 may determine a metric relevant to verifying an identity of an individual as part of an overall fraud algorithm. For example, upon verifying the identity (or other relevant characteristic) of a user (or the client device 102), verification agent 114 may update a fraud metric in the fraud algorithm. Verification agent 114 may subsequently verify the individual's identity (e.g. authenticate the user) using a fraud algorithm.

Verification agent 114 may verify a user's identification using information associated with an IP address of client device 102. Client device 102 may be assigned an IP address by router 108. The IP address may be used to both identify client device 102 and identify a location of client device 102. Verification agent 114 may leverage the IP address to identify the provider of the Internet service accessed by client device 102 (i.e., ISP 106).

For example, in some embodiments, management entity 104 may communicate with database 118. As illustrated, database 118 may include one or more accounts 122. Each account 122 may correspond to a respective user of an organization associated with management entity 104. For example, each account 122 may correspond to a financial account with an organization associated with management entity 104. Each account 122 may include personal identification information (PII) 124 and associated IP addresses 126. Personal identification information 124 may include information associated with a particular user, such as, for example, name, address, account numbers, date of birth, social security number, phone number, user name, password, and the like. IP addresses 126 may include each IP address associated with a device on which user accessed or attempted to access his/her account or an IP address associated with a location known to be associated with the user. For example, management entity 104 may include a log of IP addresses 126 that may be used to verify an identification of a user. In some embodiments, the log of IP address 126 may include valid IP addresses known to be associated with a user based on communication with one or more ISPs 106.

In some embodiments, management entity 104 may communicate with one or more ISPs 106. Each ISP may include one or more computing systems. Each of the one or more computing systems may be in communication with database 120. Database 120 may include one or more accounts 128. Each account 128 may correspond to a respective user. For example, each account 128 may correspond to a particular customer of ISP 106. Each account 128 may include personal identification information (PII) 130. Personal identification information 130 may include information associated with a particular user (or customer), such as, for example, name, address, account numbers, date of birth, social security number, phone number, user name, password, and the like.

In some embodiments, computing environment 100 may further include one or more credit bureaus 140. Each credit bureau 140 may include one or more computing systems. In operation, for example, management entity 104 may communicate with one or more credit bureaus 140 via network 105. In some embodiments, rather than communicating with an ISP 106 (directly or indirectly), management entity 104 may verify an identification of a user by checking the credit information of the user using personal identification information 124. For example, if the IP address of client device 102 purports to be associated with a particular ISP 106, verification agent 114 may communicate with credit bureau 140 to determine if a purported user has an open account with the particular ISP. In some embodiments, accounts 122 of database 118 may include information obtained from a credit bureau 140, for example, that is indicative of an existing relationship with a particular ISP.

Each of the one or more computing systems of the one or more credit bureaus 140 may be in communication with database 142. Database 142 may include one or more identities 144. Each identity 144 may include one or more accounts 146 associated therewith. For example, the one or more accounts may include loan account, bank account, credit accounts, liens, cable subscriptions, and the like.

Figure 2A:
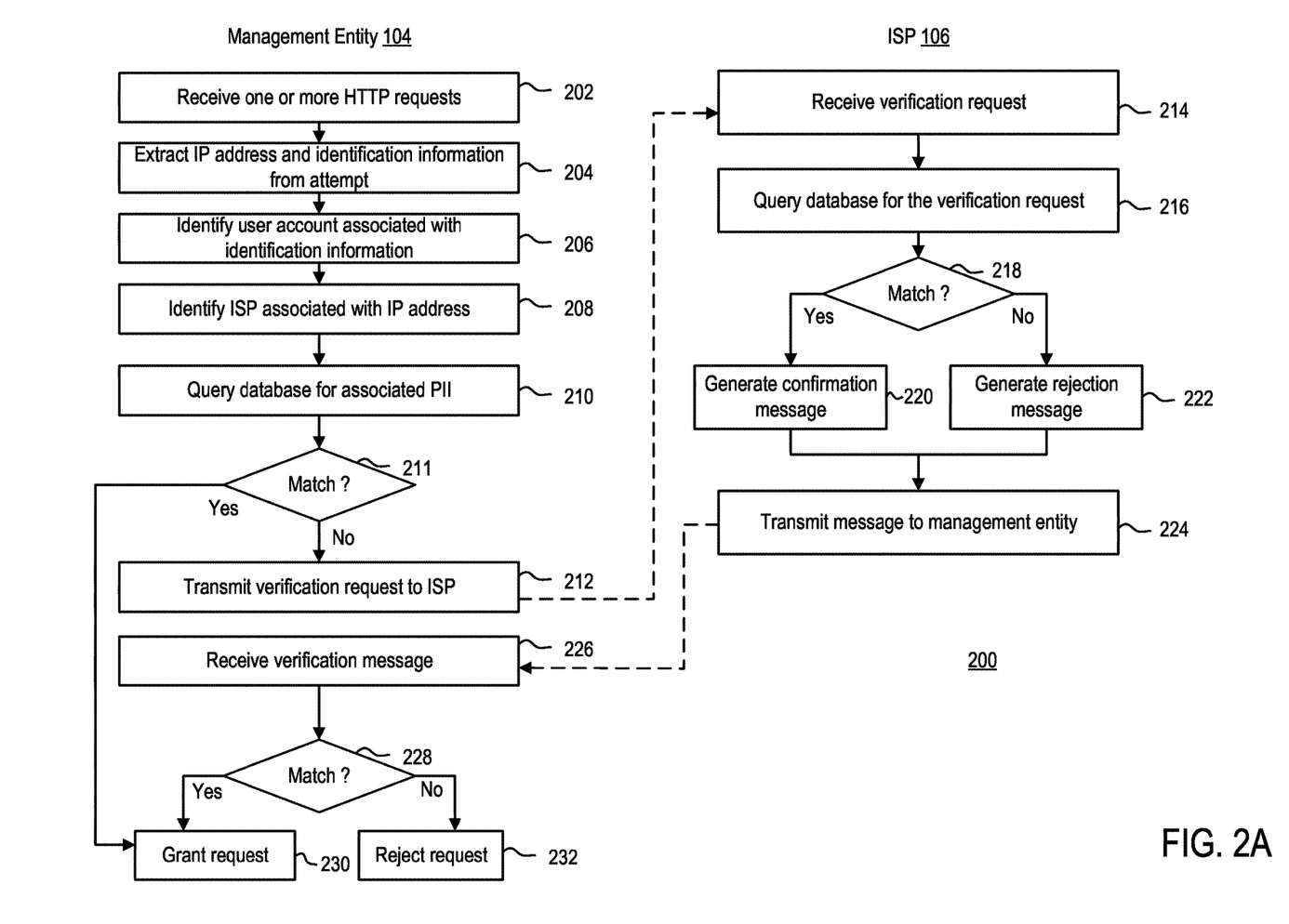
FIG. 2A is a flow diagram illustrating a method of verifying an identity of an individual, according to one embodiment.

FIG. 2A is a flow diagram illustrating a method 200 of verifying an identity of an individual, according to one embodiment. Method 200 begins at step 202. At step 202, management entity 104 may receive an HTTP request (or a plurality of requests) that triggers an identification verification process. For example, an application 116 of a client device 102 may submit an HTTP request to web client application server 112 of management entity 104, upon receiving a log-in attempt (or other request for information or action) from user of client device 102. In another example, application 116 may submit an HTTP request to web client application server 112 of management entity 104, upon receiving a request to transfer funds from a first account to a second account. Generally, the HTTP request may be an action or request for information. In some example embodiments, the HTTP request may be responsive to any request or action that merits a further verification of the requestor's identity.

At step 204, management entity 104 may identify an IP address and identification information of a user based on one or more HTTP requests received in step 202. Verification agent 114 may, for example, extract at least a user name from at least one HTTP request. In some embodiments, verification agent 114 may extract identification information from a form transmitted by application 116. For example, verification agent 114 may extract one or more of a name, address, account numbers, date of birth, social security number, phone number, user name, password, and the like, from the form transmitted by application 116. In some embodiments, verification agent 114 may extract identification information from a log-in web page submitted by application 116.

At step 206, management entity 104 may identify a user account associated with the identification information. In some embodiments, verification agent 114 may identify a user ID submitted via an HTTP request, and query database 118 to identify a user account 122 associated with the particular user ID. In some embodiments, verification agent 114 may identify one or more of a name, address, account numbers, date of birth, social security number, phone number, user name, password, and the like, in a form transmitted by application 116, and query database 118 to identify an account 122 associated with that particular set of information.

At step 208, management entity 104 may identify an ISP associated with the IP address obtained in step 204. In some embodiments, verification agent 114 may query one or more ISPs 106 to determine an ISP associated with the identified IP address of step 204. In some embodiments, verification agent 114 may query database 118 to cross-reference the received IP address of step 204 with an IP address 126 on record for account 122 to determine the ISP associated therewith. In some embodiments, verification agent 114 may have previously queried one or more ISPs 106 to determine which ISP is associated with the identified IP address 126 on record for account 122.

At step 210, management entity 104 may query database 118 for personal identification information associated with the identified user. In some embodiments, verification agent 114 may query database 118 with an identified user account 122 to retrieve personal identification information 124 from database 122. Personal identification information 124 may be used to further verify the identity of the user.

At step 211, management entity 104 may determine whether the identified IP address is associated with the user in the user's personal identification information 124. For example, management entity 104 may have previously stored an IP address associated with user's account 122 in log of IP address 126, following a previous HTTP request received from the user's client device 102. If, at step 211, management entity 104 determines that the identified IP address matches an IP address in the log of IP addresses 126, then method 200 proceeds to step 230, and management entity 104 grants the request. If, however, management entity 104 determines that the identified IP address does not match an IP address in the log of IP addresses 126, then method 200 proceeds to step 212.

At step 212, management entity 104 may transmit a verification request to ISP 106 associated with the identified IP address. In operation, verification agent 114 may transmit a request that includes a portion of the identified personal identification information associated with the user to ISP 106 for further verification. Verification agent 114 may further submit the identified IP address to ISP 106.

At step 214, ISP 106 may receive the verification request from management entity 104. At step 216, ISP 106 may query database 120 in an attempt to verify the identity of the user. For example, ISP 106 may query database 120 using information transmitted by verification agent 114. In some embodiments, ISP 106 may query database 120 using the IP address transmitted by verification agent 114. In some embodiments, ISP 106 may query database 120 using personal identification information 124 associated with the user. In some embodiments, ISP 106 may query database 120 using a combination of IP address and personal identification information 124.

At step 218, ISP 106 may determine if there is a match in database 120. In some embodiments, ISP 106 may determine if all information in the query is matched in database 120. In some embodiments, ISP 106 may determine if at least a threshold amount of information is matched in database 120. For example, ISP 106 may determine if at least the social security number of the user is matched in database 120 or a physical address associated with the user and the IP address matches information in database 120. Generally, ISP 106 may generate a query that includes one or more of IP address and personal identification information 124 transmitted by verification agent 114. Database 120 stores account information 128 associated with users that subscribe to the service of ISP 106. As such, ISP 106 may be able to verify if information submitted to management entity 104 as part of the HTTP request in step 202 is consistent based off user records associated with ISP 106.

If at step 218, ISP 106 determines that there is a match in database 120 between information in the query and information stored in database 120 (e.g., account 128, personal identification information 130), then at step 220, ISP generates a confirmation message. If, however, at step 218, ISP 106 determines that there is not a match in database 120 between information in the query and information stored in database 120, then at step 222, ISP 106 may generate a rejection message. At step 224, ISP 106 may transmit the message (either rejection message or confirmation message) to management entity 104.

At step 226, management entity 104 may receive the message from ISP 106. At step 228, management entity 104 parses the message to determine whether there was a match between the information transmitted to ISP 106 and the information stored in database 120. For example, verification agent 114 may parse the message to determine whether the user's identify was verified by ISP 106. If, at step 228, management entity 104 determines that there is not a match between the information transmitted to ISP 106 and the information stored in database 120, then at step 232, management entity 104 may reject the request that warrants an identification verification (e.g., the HTTP request of step 202). In some embodiments, rather than rejecting the request, verification agent 114 may update a metric associated with an overall fraud algorithm, which may be used to approve or deny various transactions stemming from this IP address.

If, however at step 228, management entity 104 determines that there is a match between the information transmitted to ISP 106 and the information stored in database 120, then at step 230, management entity 104 may accept the request that warrants the identification verification. In some embodiments, rather than accept the request, verification agent 114 may update a metric associated with an overall fraud algorithm, which may be used to approve or deny various transactions stemming from this IP address. In some embodiments, in addition to taking proactive approach to accepting the user's request, verification agent 114 may pre-populate one or more fields of a form for the user. For example, the user may submit an HTTP request to fill out a credit card form, along with a threshold amount of personal identification information for the verification process. Upon verifying the user's identity, verification agent 114 may further provide a credit card application to the user with pre-populated forms.

Figure 2B:
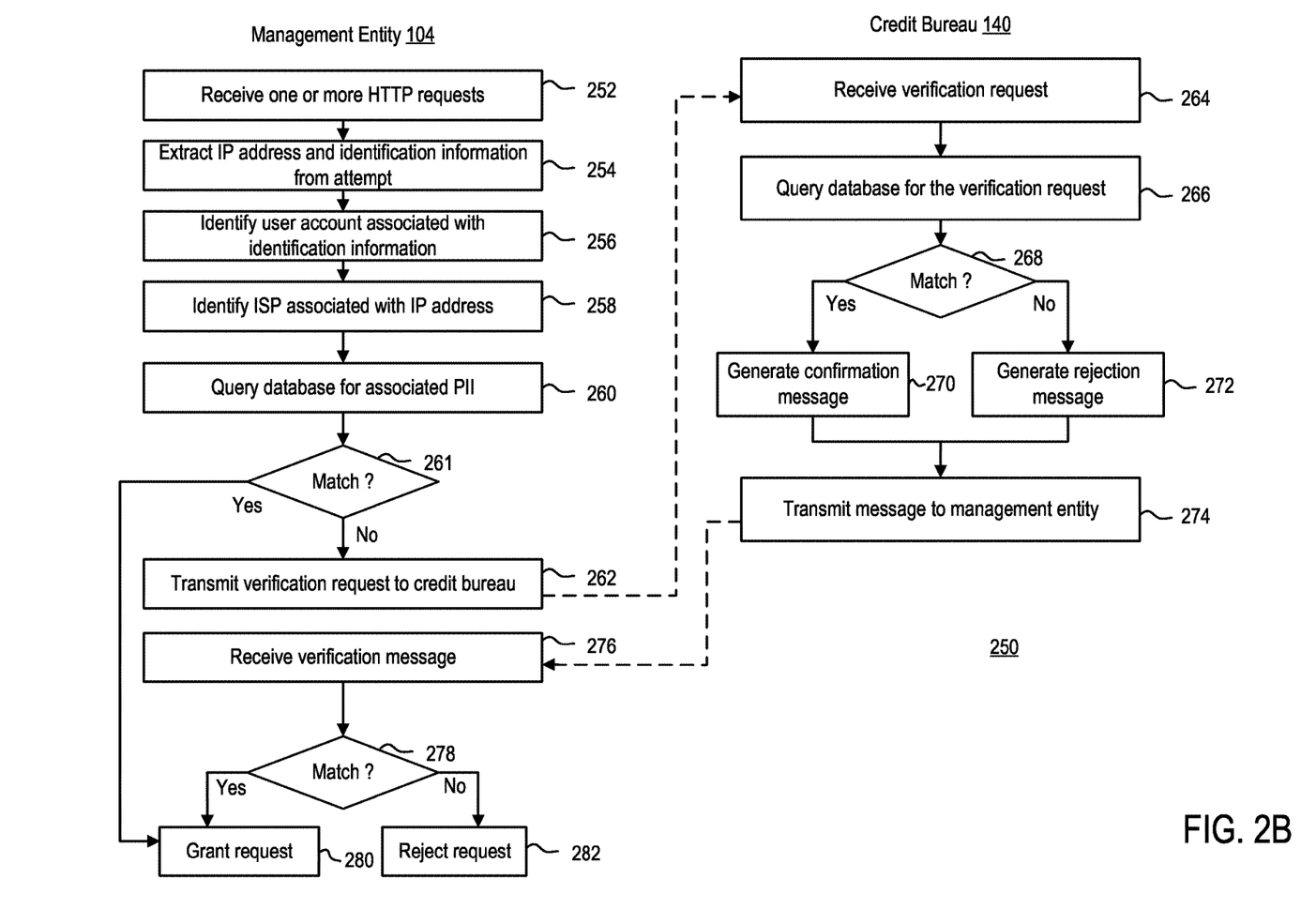
FIG. 2B is a flow diagram illustrating a method of verifying an identity of an individual, according to one embodiment.

FIG. 2B is a flow diagram illustrating a method 250 of verifying an identity of an individual, according to an example embodiment. Method 250 is substantially similar to method 200. In particular, steps 252, 254, 256, 258, 260, and 261 in method 250 may generally correspond to steps 202, 204, 206, 208, 210, and 211 respectively, as discussed above. Method 250 begins at step 252. At step 252, management entity 104 may receive an HTTP request (or a plurality of requests) that triggers an identification verification process. For example, application 116 of client device 102 may submit an HTTP request to web client application server 112 of management entity 104, upon receiving a log-in attempt (or other request for information or action) from user of client device 102. In another example, application 116 may submit an HTTP request to web client application server 112 of management entity 104, upon receiving a request to transfer funds from a first account to a second account. Generally, the HTTP request could be for any action or request for information. In some example embodiments, the HTTP request may be responsive to any request or action that merits a further verification of the requestor's identity.

At step 254, management entity 104 may identify an IP address and identification information of a user based on one or more HTTP requests received in step 252. Verification agent 114 may, for example, extract at least a user name from at least one HTTP request. In some embodiments, verification agent 114 may extract identification information from a form transmitted by application 116. For example, verification agent 114 may extract one or more of a name, address, account numbers, date of birth, social security number, phone number, user name, password, and the like, from the form transmitted by application 116. In some embodiments, verification agent 114 may extract identification information from a log-in web page submitted by application 116.

At step 256, management entity 104 may identify a user account associated with the identification information. In some embodiments, verification agent 114 may identify a user ID submitted via an HTTP request, and query database 118 to identify a user account 122 associated with the particular user ID. In some embodiments, verification agent 114 may identify one or more of a name, address, account numbers, date of birth, social security number, phone number, user name, password, and the like, in a form transmitted by application 116, and query database 118 to identify an account 122 associated with that particular set of information.

At step 258, management entity 104 may identify an ISP associated with IP address obtained in step 254. In some embodiments, verification agent 114 may query one or more ISPs 106 to determine an ISP associated with the identified IP address of step 254. In some embodiments, verification agent 114 may query database 118 to cross-reference the received IP address of step 254 with an IP address 126 on record for account 122 to determine the ISP associated therewith. In some embodiments, verification agent 114 may have previously queried one or more ISPs 106 to determine which ISP is associated with the identified IP address 126 on record for account 122.

At step 260, management entity 104 may query database 118 for personal identification information associated with the identified user. In some embodiments, verification agent 114 may query database 118 with an identified user account 122 to retrieve personal identification information 124 from database 122. Personal identification information 124 may be used to further verify the identity of the user.

At step 261, management entity 104 may determine whether the identified IP address is associated with the user in the user's personal identification information 124. For example, management entity 104 may have previously stored an IP address associated with user's account 122 in log of IP address 126, following a previous HTTP request received from the user's client device 102. If, at step 261, management entity 104 determines that the identified IP address matches an IP address in the log of IP addresses 126, then method 250 proceeds to step 280, and management entity 104 grants the request. If, however, management entity 104 determines that the identified IP address does not match an IP address in the log of IP addresses 126, then method 250 proceeds to step 262.

At step 262, management entity 104 may transmit a verification request to credit bureau 140. In operation, verification agent 114 may transmit a request that includes a portion of the identified personal identification information associated with the user to credit bureau 140 for further verification. Verification agent 114 may further submit the identified ISP to credit bureau 140. By submitting the ISP to credit bureau 140, credit bureau 140 may verify that user has an account open with that particular ISP.

At step 264, credit bureau 140 may receive the verification request from management entity 104. At step 266, credit bureau 140 may query database 142 in an attempt to verify the identity of the user. For example, credit bureau 140 may query database 142 using information transmitted by verification agent 114. In some embodiments, credit bureau 140 may query database 142 using personal identification information 124 associated with the user. For example, credit bureau 140 may query database 142 using a social security number and date of birth of the user.

At step 268, credit bureau 140 may determine if the user associated with the personal identification information 124 has an open account with ISP 106. By determining whether a particular user has an open account associated with the ISP from which the user's IP address stems, credit bureau 140 may provide further identification verification of the user. For example, if user is indeed a subscriber to ISP 106, then credit bureau 140, by running a credit report, may be able to determine that user has an open account with ISP 106.

If at step 268, credit bureau 140 determines that there is a match in database 142 between information in the query and an open account with ISP 106 in database 142 then at step 270, credit bureau 140 may generate a confirmation message. If, however, at step 268, credit bureau 140 determines that there is not a match in database 142 between information in the query and an open account with ISP 106 in database 142, then at step 272, credit bureau 140 may generate a rejection message. At step 274, credit bureau 140 may transmit the message (either rejection message or confirmation message) to management entity 104.

At step 276, management entity 104 may receive the message from credit bureau 140. At step 278, management entity 104 parses the message to determine whether user indeed has an open account with ISP 106. If, at step 276, management entity 104 determines that user does not have an open account with ISP 106, then at step 282, management entity 104 may reject the request that warrants an identification verification (e.g., the HTTP request of step 252). In some embodiments, rather than rejecting the request, verification agent 114 may update a metric associated with an overall fraud algorithm, which may be used to approve or deny various transactions stemming from this IP address.

If, however at step 278, management entity 104 determines that the user does have an open account with ISP 106, then at step 280, management entity 104 may accept the request that warrants the identification verification. In some embodiments, rather than accepting the request, verification agent 114 may update a metric associated with an overall fraud algorithm, which may be used to approve or deny various transactions stemming from this IP address. In some embodiments, in addition to taking proactive approach to accepting the user's request, verification agent 114 may pre-populate one or more fields of a form for the user. For example, the user may submit an HTTP request to fill out a credit card form, along with a threshold amount of personal identification information for the verification process. Upon verifying the user's identity, verification agent 114 may further provide a credit card application to user with pre-populated forms.

Figure 2C:
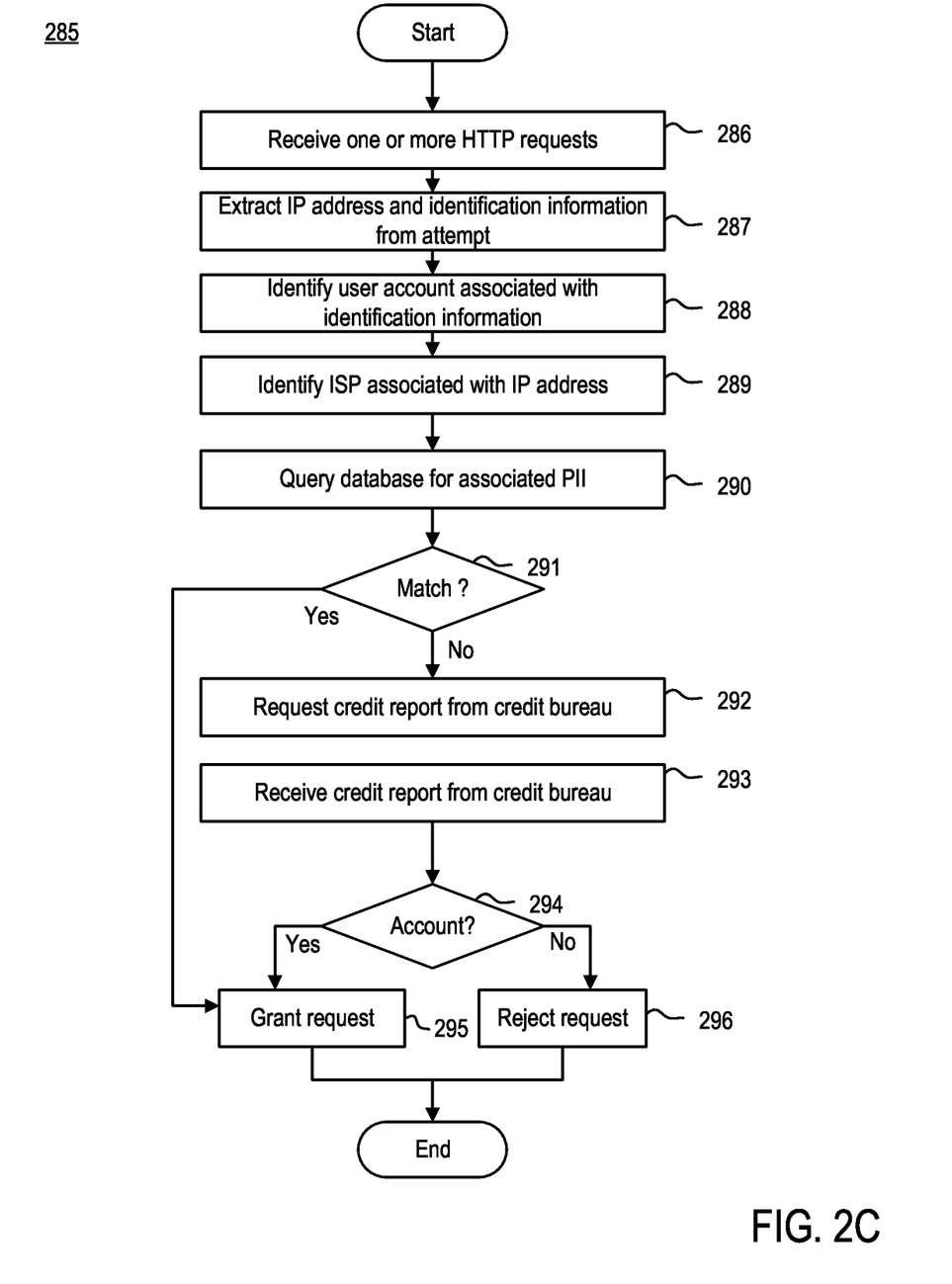
FIG. 2C is a flow diagram illustrating a method of verifying an identity of an individual, according to one embodiment.

FIG. 2C a flow diagram illustrating a method 250 of verifying an identity of an individual, according to an example embodiment. Method 250 is substantially similar to method 200. In particular, steps 286, 287, 288, 289, 290, and 291 in method 285 may generally correspond to steps 202, 204, 206, 208, 210, and 211 respectively, as discussed above. Method 285 begins at step 286.

At step 286, management entity 104 may receive an HTTP request (or a plurality of requests) that triggers an identification verification process. For example, application 116 of client device 102 may submit an HTTP request to web client application server 112 of management entity 104, upon receiving a log-in attempt (or other request for information or action) from user of client device 102. In another example, application 116 may submit an HTTP request to web client application server 112 of management entity 104, upon receiving a request to transfer funds from a first account to a second account. Generally, the HTTP request could be for any action or request for information. In some example embodiments, the HTTP request may be responsive to any request or action that merits a further verification of the requestor's identity.

At step 287, management entity 104 may identify an IP address and identification information of a user based on one or more HTTP requests received in step 286. Verification agent 114 may, for example, extract at least a user name from at least one HTTP request. In some embodiments, verification agent 114 may extract identification information from a form transmitted by application 116. For example, verification agent 114 may extract one or more of a name, address, account numbers, date of birth, social security number, phone number, user name, password, and the like, from the form transmitted by application 116. In some embodiments, verification agent 114 may extract identification information from a log-in web page submitted by application 116.

At step 288, management entity 104 may identify a user account associated with the identification information. In some embodiments, verification agent 114 may identify a user ID submitted via an HTTP request, and query database 118 to identify a user account 122 associated with the particular user ID. In some embodiments, verification agent 114 may identify one or more of a name, address, account numbers, date of birth, social security number, phone number, user name, password, and the like, in a form transmitted by application 116, and query database 118 to identify an account 122 associated with that particular set of information.

At step 289, management entity 104 may identify an ISP associated with IP address obtained in step 287. In some embodiments, verification agent 114 may query one or more ISPs 106 to determine an ISP associated with the identified IP address of step 287. In some embodiments, verification agent 114 may query database 118 to cross-reference the received IP address of step 287 with an IP address 126 on record for account 122 to determine the ISP associated therewith. In some embodiments, verification agent 114 may have previously queried one or more ISPs 106 to determine which ISP is associated with the identified IP address 126 on record for account 122.

At step 290, management entity 104 may query database 118 for personal identification information associated with the identified user. In some embodiments, verification agent 114 may query database 118 with an identified user account 122 to retrieve personal identification information 124 from database 122. Personal identification information 124 may be used to further verify the identity of the user.

At step 291, management entity 104 may determine whether the identified IP address is associated with the user in the user's personal identification information 124. For example, management entity 104 may have previously stored an IP address associated with user's account 122 in log of IP address 126, following a previous HTTP request received from the user's client device 102. If, at step 291, management entity 104 determines that the identified IP address matches an IP address in the log of IP addresses 126, then method 285 proceeds to step 295, and management entity 104 grants the request. If, however, management entity 104 determines that the identified IP address does not match an IP address in the log of IP addresses 126, then method 285 proceeds to step 292.

At step 292, management entity 104 may transmit a request to a credit bureau (e.g., credit bureau 140) to generate a credit report for the user. For example, management entity 104 may transmit personal identification information of user (e.g., social security number, date of birth, name, address, etc.) to credit bureau, such that credit bureau can generate a "soft" credit report for the user. The credit report may include, for example, a list of open accounts (e.g., ISP account) that are associated with the user. At step 293, management entity 104 may receive the credit report from the credit bureau.

At step 294, management entity 104 may parse the received credit report to determine whether user indeed has an open account with an ISP 106 associated with the identified IP address. If, at step 294, management entity 104 determines that user does not have an open account with ISP 106, then at step 296, management entity 104 may reject the request that warrants an identification verification (e.g., the HTTP request of step 286). In some embodiments, rather than rejecting the request, verification agent 114 may update a metric associated with an overall fraud algorithm, which may be used to approve or deny various transactions stemming from this IP address.

If, however at step 294, management entity 104 determines that the user does have an open account with an ISP 106 associated with the identified IP address, then at step 295, management entity 104 may grant the request that warrants the identification verification. In some embodiments, rather than granting the request, verification agent 114 may update a metric associated with an overall fraud algorithm, which may be used to approve or deny various transactions stemming from this IP address. In some embodiments, in addition to taking proactive approach to accepting the user's request, verification agent 114 may pre-populate one or more fields of a form for the user. For example, the user may submit an HTTP request to fill out a credit card form, along with a threshold amount of personal identification information for the verification process. Upon verifying the user's identity, verification agent 114 may further provide a credit card application to user with pre-populated forms.

Figure 3:
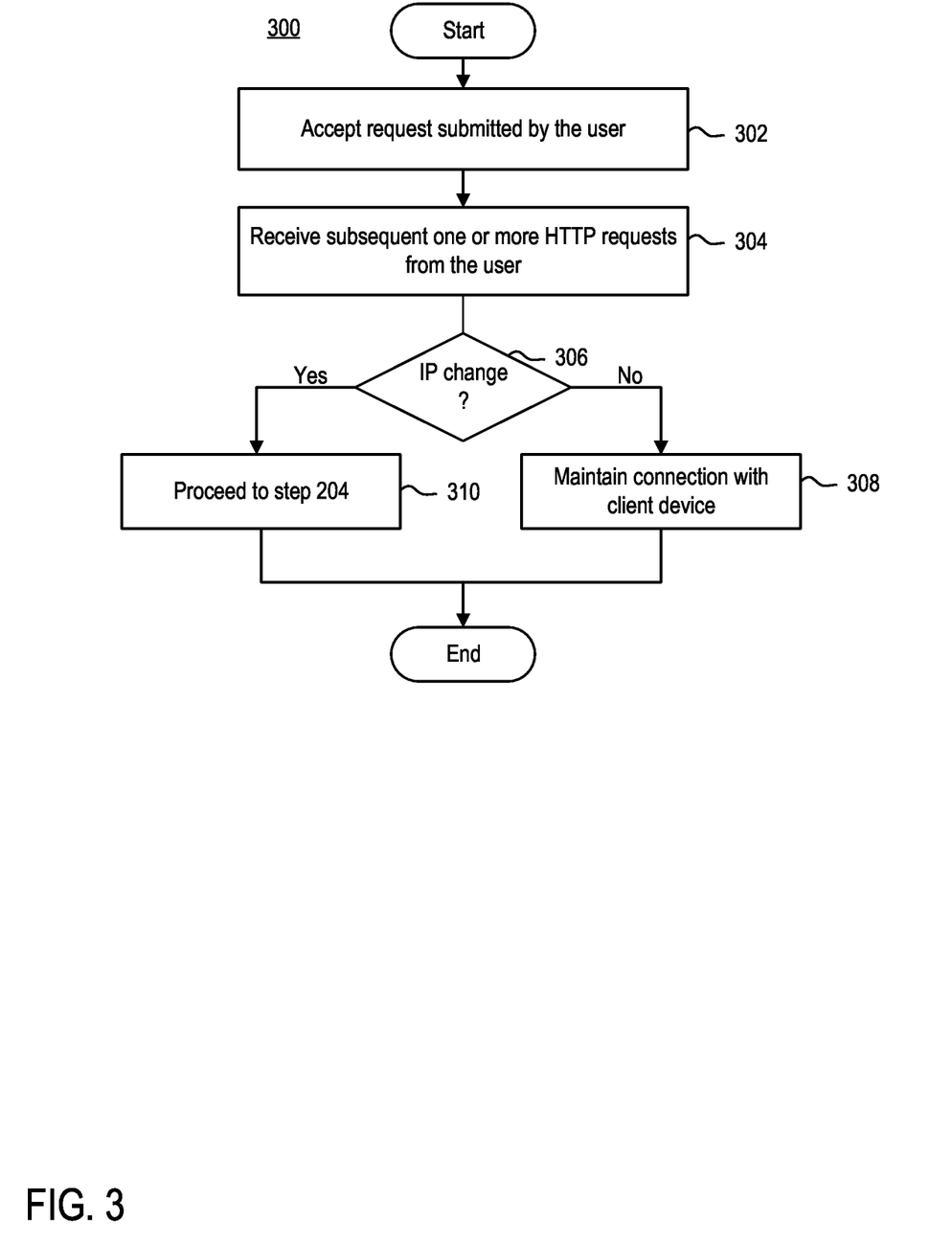
FIG. 3 is a flow diagram illustrating a method of verifying an identity of an individual, according to one embodiment.

FIG. 3 is a flow diagram illustrating a method 300 of verifying an identity of an individual, according to some embodiments. Method 300 begins at step 302. At step 302, management entity 104 accepts a request submitted by the user. For example, referring back to FIG. 2A, ISP 106 may have found a match between the information the personal identification information and IP address transmitted to ISP 106 in a verification request (e.g., step 212) and information stored in a database (e.g., database 120) accessed by ISP 106.

At step 304, management entity 104 may receive a subsequent HTTP request that triggers an identification verification process. For example, the application 116 may submit an HTTP request to web client application server 112 of management entity 104, upon receiving a log-in attempt from user of client device 102. In another example, application 116 may submit an HTTP request to web client application server 112 of management entity 104, upon receiving a request to transfer funds from a first account to a second account. Generally, the HTTP request may be responsive to any request or action that merits a further verification of the requestor's identity.

At step 306, management entity 104 may query database 118 to determine whether there has been a change in IP addresses between requests from the user. For example, verification agent 114 may determine if, after a previously successful identification verification for the user at a given IP address, whether the user has attempted to log-in from another IP address. Database 118 may record a list of IP addresses (e.g., IPs 126) from all previously received HTTP requests for each account 122.

If, at step 306, management entity 104 determines that there has been a change in IP addresses associated with user's account 122 (e.g., associated with prior HTTP requests of the user), then at step 310, method 300 proceeds to step 204 in FIG. 2A or step 254 in FIG. 2B for further processing.

If, however, at step 306, management entity 104 determines that there has not been a change in IP address associated with the user's account between successive HTTP requests, then at step 308, management entity 104 may maintain connection with the user. In other words, management entity 104 may maintain a static verification session with the user until management entity 104 determines that the user has submitted an HTTP request from a different IP address.

Figure 4:
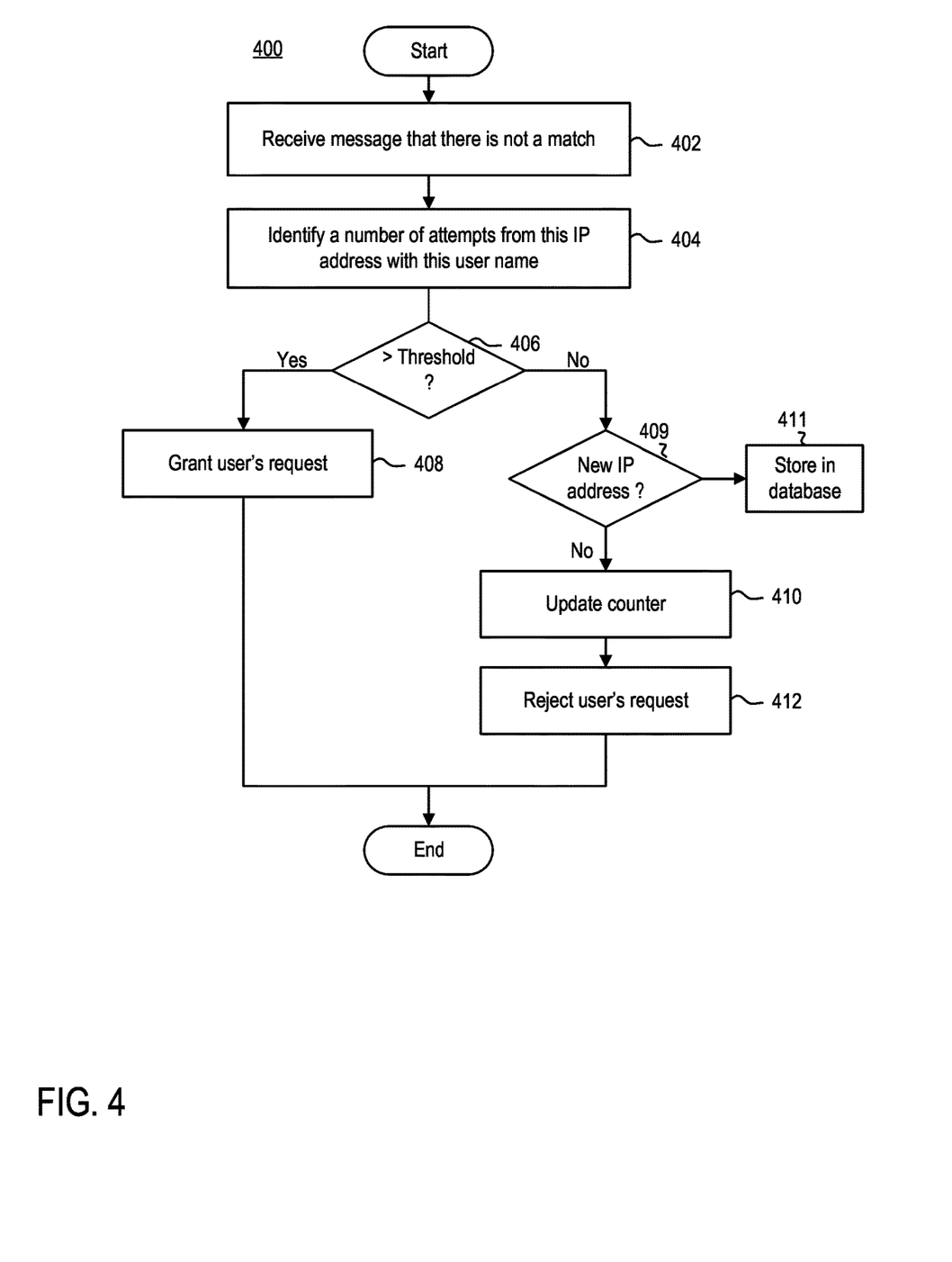
FIG. 4 is a flow diagram illustrating a method of verifying an identity of an individual, according to one embodiment.

FIG. 4 is a flow diagram of a method 400 of verifying an identification of a user, according to some embodiments. Method 400 begins at step 402. At step 402, management entity 104 may receive a message from ISP 106 that there is not a match between information in the verification request and information in database 120 accessed by ISP 106. For example, referring back to FIG. 2A, ISP 106 may not have found a match between the personal identification information and IP address transmitted to ISP 106 in a verification request (e.g., step 212) and information stored in a database (e.g., database 120) accessed by ISP 106.

At step 404, management entity 104 may identify a number of attempts from this IP address with the submitted user credentials. For example, in some situations, a user may be associated with a given IP address but may not be on the account associated with the respective ISP. Such situations may arise, for example, when an account holder's children are logging on to their accounts from the home network. Such situations may also arise, for example, when the account holder is an entity (e.g., a school), and students are logging on to their accounts from the school network. In some embodiments, matching a received IP address to a stored IP address may include an exact matching between each digit of the received IP address to each digit of a stored IP address. In some embodiments, matching a received IP address to a stored IP address may include a partial matching. For example, those skilled in the art may readily imagine a scenario in which a user attempts to access his or her account from a school. The school may be associated with a plurality of IP addresses that change for the user (e.g., the least significant digits of the particular host may not be relevant). Accordingly, a match may occur even if there is not an exact match between each digit of the received IP address and the stored IP addresses. In other words, management entity 104 is attempting to determine whether the user has some known valid association with an IP address.

At step 406, management entity 104 may determine whether at least a threshold amount of attempts from a particular IP address with the user credentials has been exceeded. The threshold amount of attempts may serve as a barometer for determining that a particular user is associated with a particular account with an ISP.

If, at step 406, management entity 104 determines that the threshold amount of attempts has been exceeded, then at step 408 management entity 104 may accept the request. In some embodiments, rather than accepting the request, verification agent 114 may update a metric associated with an overall fraud algorithm, which may be used to approve or deny various transactions stemming from this IP address.

If, however, at step 406, management entity 104 determines that the threshold amount of attempts has not been exceeded, then at step 410, management entity 104 may update a counter associated with the user's account for this IP address (or a slight variation of the IP address). At step 409, management entity 104 may determine whether the identified IP address is a new IP address (e.g., not previously stored in database 118). If at step 409 management entity 104 determines that the identified IP address is a new IP address, then at step 411, management entity 104 stores the identified IP address in database 118. At step 412, management entity 104 may reject the user's request. In some embodiments, rather than rejecting the request, verification agent 114 may update a metric associated with an overall fraud algorithm, which may be used to approve or deny various transactions stemming from this IP address.

Figure 5:
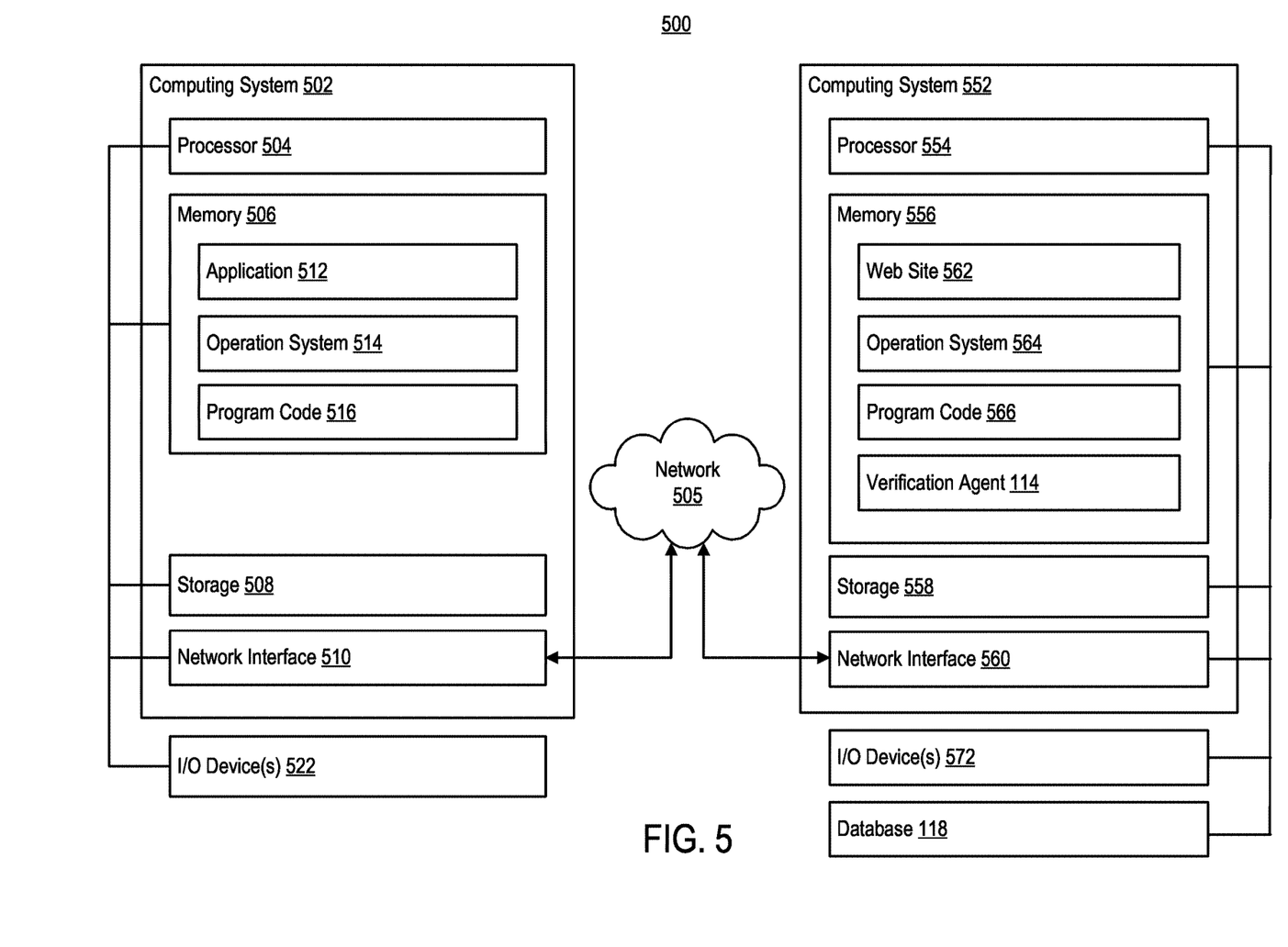
FIG. 5 is a block diagram illustrating example components of a computing environment, according to one embodiment.

FIG. 5 is a block diagram illustrating an exemplary computing environment 500, according to some embodiments. Computing environment 500 includes computing system 502 and computing system 552. Computing system 502 may be representative of client device 102. Computing system 552 may be representative of management entity 104.

Computing system 502 may include a processor 504, a memory 506, a storage 508, and a network interface 510. In some embodiments, computing system 502 may be coupled to one or more I/O device(s) 522 (e.g., keyboard, mouse, etc.).

Processor 504 retrieves and executes program code 516 (i.e., programming instructions) stored in memory 506, as well as stores and retrieves application data. Processor 504 is included to be representative of a single processor, multiple processors, a single processor having multiple processing cores, and the like. Network interface 510 may be any type of network communications allowing computing system 502 to communicate externally via computing network 505. For example, network interface 510 is configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include application 512, operating system 514, and program code 516. Program code 516 may be accessed by processor 504 for processing (i.e., executing program instructions). Program code 516 may include, for example, executable instructions for communicating with computing system 552 to display one or more pages of website 562. Application 512 may enable a user of computing system 502 to access a functionality of computing system 552. For example, application 512 may access content managed by computing system 552, such as website 562. The content that is displayed to a user of computing system 502 may be transmitted from computing system 552 to computing system 502, and subsequently processed by application 512 for display through a graphical user interface (GUI) of computing system 502.

Computing system 552 may include a processor 554, a memory 556, a storage 558, and a network interface 560. In some embodiments, computing system 552 may be coupled to one or more I/O device(s) 572. In some embodiments, computing system 552 may be in communication with database 118.

Processor 554 retrieves and executes program code 566 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include website 562, operating system 564, program code 566, and verification agent 114. Program code 566 may be accessed by processor 554 for processing (i.e., executing program instructions). Program code 566 may include, for example, executable instructions configured to perform steps discussed above in conjunction with FIGS. 3-4. As an example, processor 554 may access program code 566 to perform operations for verifying an identity of an individual transmitting, for example, an authentication request or a transaction request, via a web browser/application (e.g., application 512). In another example, processor 554 may access program code 566 to perform operations for determining known associations between IP addresses of a user request and a user. Website 562 may be accessed by computing system 502. For example, website 562 may include content accessed by computing system 502 via a web browser or application.

Verification agent 114 may be configured to interact with computing system 502 via an application to verify an identity of a user operating, for example, computing system 502. In some embodiments, verification agent 114 may verify an identity of user during an authentication process. For example, a user may be attempting to access his or her account, and verification agent 114 may be configured to aid in further authentication of the user. In some embodiments, verification agent 114 may verify an identity of a user during a transaction process. For example, a user may be attempting to submit a payment or transfer funds across different accounts. In some embodiments, verification agent 114 may verify an identity of an individual as part of an overall fraud algorithm. For example, upon verifying the identity of a user, verification agent 114 may update a fraud metric in the fraud algorithm.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of increasing confidence in verifying an identity of a user without user interaction, comprising:
   receiving, by a computing system, a request to further authenticate a user from a remote server, the request responsive to the user initiating a multi-factor authentication process with the remote server;
   identifying, by the computing system, at least a first item of identification information and an internet protocol (IP) address associated with a client device of the user;
   identifying, by the computing system, a third party internet service provider associated with the IP address;
   transmitting, by the computing system, a verification message to the third party internet service provider, the verification message comprising at least the first item of identification information associated with the user;
   receiving, by the computing system, a confirmation message from the third party internet service provider indicative of a verification of an identity of the user; and
   based on the confirmation message, authenticating, by the computing system, the user with the remote server.

2. The method of claim 1, wherein transmitting, by the computing system, the verification message to the third party internet service provider comprises:
   transmitting a current location of the client device.

3. The method of claim 1, wherein the first item of identification information comprises at least a name, address, social security number, telephone number, email address, date of birth, and credit card information.

4. The method of claim 1, wherein the first item of identification information includes a name of an authorized user to a primary user of an account with the third party internet service provider.

5. The method of claim 1, further comprising:
   receiving, by the computing system, a second request to further authenticate the user from a second remote server;
   identifying, by the computing system, at least the first item of identification information and the IP address associated with the client device of the user; and
   based on the identifying, authenticating, by the computing system, the user with the second remote server.

6. The method of claim 1, further comprising:
   receiving, by the computing system, a second request to further authenticate the user from a second remote server;
   identifying, by the computing system, at least the first item of identification information and a second IP address associated with the client device of the user, wherein the second IP address is different from the IP address;
   identifying, by the computing system, a second third party internet service provider associated with the second IP address;
   transmitting, by the computing system, a second verification message to the third party internet service provider, the verification message comprising at least the first item of identification information associated with the user;
   receiving, by the computing system, a second confirmation message from the second third party internet service provider indicative of a second verification of the identity of the user; and
   based on the confirmation message, authenticating, by the computing system, the user with the second remote server.

7. The method of claim 1, further comprising:
receiving, by the computing system, a second request to further authenticate the user from the remote server;
identifying, by the computing system, at least the first item of identification information and a second IP address associated with the client device of the user, wherein the second IP address is different from the IP address;
identifying, by the computing system, a second third party internet service provider associated with the second IP address;
transmitting, by the computing system, a second verification message to the third party internet service provider, the verification message comprising at least the first item of identification information associated with the user;
receiving, by the computing system, a second confirmation message from the second third party internet service provider indicative of a second verification of the identity of the user; and
based on the confirmation message, authenticating, by the computing system, the user with the remote server.

8. A system, comprising:
a processor; and
a memory having programming instructions stored thereon, which, when executed by the processor, causes the system to perform operations:
receiving a request to further authenticate a user from a remote server, the request responsive to the user initiating a multi-factor authentication process with the remote server;
identifying at least a first item of identification information and an internet protocol (IP) address associated with a client device of the user;
identifying a third party internet service provider associated with the IP address;
transmitting a verification message to the third party internet service provider, the verification message comprising at least the first item of identification information associated with the user;
receiving a confirmation message from the third party internet service provider indicative of a verification of an identity of the user; and
based on the confirmation message, authenticating the user with the remote server.

9. The system of claim 8, wherein transmitting the verification message to the third party internet service provider comprises:
transmitting a current location of the client device.

10. The system of claim 8, wherein the first item of identification information comprises at least a name, address, social security number, telephone number, email address, date of birth, and credit card information.

11. The system of claim 8, wherein the first item of identification information includes a name of an authorized user to a primary user of an account with the third party internet service provider.

12. The system of claim 8, wherein the operations further comprise:
receiving a second request to further authenticate the user from a second remote server;
identifying at least the first item of identification information and the IP address associated with the client device of the user; and
based on the identifying, authenticating the user with the second remote server.

13. The system of claim 8, wherein the operations further comprise:
receiving a second request to further authenticate the user from a second remote server;
identifying at least the first item of identification information and a second IP address associated with the client device of the user, wherein the second IP address is different from the IP address;
identifying a second third party internet service provider associated with the second IP address;
transmitting a second verification message to the third party internet service provider, the verification message comprising at least the first item of identification information associated with the user;
receiving a second confirmation message from the second third party internet service provider indicative of a second verification of the identity of the user; and
based on the confirmation message, authenticating the user with the second remote server.

14. The system of claim 8, wherein the operations further comprise:
receiving a second request to further authenticate the user from the remote server;
identifying at least the first item of identification information and a second IP address associated with the client device of the user, wherein the second IP address is different from the IP address;
identifying a second third party internet service provider associated with the second IP address;
transmitting a second verification message to the third party internet service provider, the verification message comprising at least the first item of identification information associated with the user;
receiving a second confirmation message from the second third party internet service provider indicative of a second verification of the identity of the user; and
based on the confirmation message, authenticating the user with the remote server.

15. A non-transitory computer readable medium comprising one or more sequences of instructions, which, when executed by a processor, causes a computing system to perform operations comprising:
receiving, by the computing system, a request to further authenticate a user from a remote server, the request responsive to the user initiating a multi-factor authentication process with the remote server;
identifying, by the computing system, at least a first item of identification information and an internet protocol (IP) address associated with a client device of the user;
identifying, by the computing system, a third party internet service provider associated with the IP address;
transmitting, by the computing system, a verification message to the third party internet service provider, the verification message comprising at least the first item of identification information associated with the user;
receiving, by the computing system, a confirmation message from the third party internet service provider indicative of a verification of an identity of the user; and
based on the confirmation message, authenticating, by the computing system, the user with the remote server.

16. The non-transitory computer readable medium of claim 15, wherein transmitting, by the computing system, the verification message to the third party internet service provider comprises:
transmitting a current location of the client device.

17. The non-transitory computer readable medium of claim 15, wherein the first item of identification information comprises at least a name, address, social security number, telephone number, email address, date of birth, and credit card information.

18. The non-transitory computer readable medium of claim 15, wherein the first item of identification information includes a name of an authorized user to a primary user of an account with the third party internet service provider.

19. The non-transitory computer readable medium of claim 15, further comprising:
   receiving, by the computing system, a second request to further authenticate the user from a second remote server;
   identifying, by the computing system, at least the first item of identification information and the IP address associated with the client device of the user; and
   based on the identifying, authenticating, by the computing system, the user with the second remote server.

20. The non-transitory computer readable medium of claim 15, further comprising:
   receiving, by the computing system, a second request to further authenticate the user from a second remote server;
   identifying, by the computing system, at least the first item of identification information and a second IP address associated with the client device of the user, wherein the second IP address is different from the IP address;
   identifying, by the computing system, a second third party internet service provider associated with the second IP address;
   transmitting, by the computing system, a second verification message to the third party internet service provider, the verification message comprising at least the first item of identification information associated with the user;
   receiving, by the computing system, a second confirmation message from the second third party internet service provider indicative of a second verification of the identity of the user; and
   based on the confirmation message, authenticating, by the computing system, the user with the second remote server.

* * * * *